United States Patent Office 3,554,772
Patented Jan. 12, 1971

3,554,772
METHOD OF PASTEURIZING FLOUR
Cloyce L. Hankinson, Camillus, Ernest George Linke, North Syracuse, and William Arvid Seleen, Dewitt, N.Y., assignors to Borden, Inc., New York, N.Y., a corporation of New Jersey
No Drawing. Filed Jan. 30, 1967, Ser. No. 612,319
Int. Cl. A21d 6/00
U.S. Cl. 99—215                                    5 Claims

ABSTRACT OF THE DISCLOSURE

A stable pasteurized flour composition with a substantial proportion of the enzymes therein inactivated is prepared by heating an aqueous flour suspension to about 135° to 150° F. in the presence of a hydration prevention agent, said hydration prevention agent being present in an amount sufficient to result in a suspension viscosity not greater than one-half the viscosity of the same flour suspension in water measured without any hydration prevention agent.

---

This invention relates to stable pasteurized flour compositions and to the method of making them and to doughs and batters incorporating such compositions.

Presently doughs and batters can be packaged and stored under proper refrigeration temperatures for limited periods of 8 to 12 weeks and can be subsequently baked and be in an edible condition. However, during this limited period of storage and beyond, physical and chemical changes occur which cause the originally fresh dough or batter product to become deteriorated. It is believed that an important factor in the deterioration of stored doughs and batters is the action of enzymes naturally present in flour. Lipases, proteases, amylases, and other enzymes are known to be present and under the moisture conditions present in the dough and batter attack the fat, protein and starch, resulting in increases in fatty acid, free amino groups and soluble sugars, all of which act to form a deteriorated dough or batter product. Another important factor in this aging is the growth of microorganisms in the product. Even under refrigeration, these microbes break down the dough structure through enzymatic reaction, or by release of acidic by-products in their metabolism. The release of these acidic materials in the case of canned chemically-leavened doughs and batters increases the internal can pressure through increased carbon dioxide evolution from the leavening system and results in can fatigue with ruptures and explosions. These deteriorative effects have also been noted in dry flour mixes which are subject to moisture during storage.

Heating of the flour to be used in bakery products has been attempted to inactivate both the enzymes present in the flour and to reduce the microbial population to as low a level as possible. Flour has been heated at a temperature of 140° F. for a sufficient period of time (1 hour) to reduce the activity of the lipolytic and proteolytic enzymes. However, this has not proven successful, since the glutenin and gliadin present in the flour are denatured at the temperatures required to inactivate the enzymes and destroy the microbes. If these flour proteins become denatured the gluten formed, when liquid is added to form a batter or dough, is much less extensible, and also loses most of its ability to retain carbon dioxide released in the leavening process. The result is a dough or batter with practically none of the required functional properties; i.e., those chemical and physical properties which a dough or batter must have for proper gluten development in the mixing stage and acceptable handling of the dough in make-up, all of which combine to yield a baked product with good organoleptic acceptance.

The present invention is directed to the method of heating flour whereby the microbial population can be reduced and the flour enzymes substantially inactivated without adversely affecting the functional properties of the flour, and to the resultant flour, and doughs and batters made therefrom which have an extended shelf life.

Briefly stated, the present invention comprises heating an aqueous suspension of flour in the presence of a hydration prevention agent for a time and at a temperature sufficient to reduce the bacterial count and inactivate the degradative enzymes in the flour and to the resulting products of that process. The invention also has reference to products comprising the treated flour compositions such as doughs, batters, and dry flour mixes subjected to moisture during storage; especially chemically-leavened refrigerated dough products.

The term "doughs and batters" is used in its broad sense to refer to all bakery doughs and batters, refrigerated and nonrefrigerated, leavened and unleavened, packaged in cans, boxes, plastic films and the like containers and used to produce such products as breads, cakes, biscuits, cookies, rolls, cinnamon or nut rolls, Danish pastry, coffee rings, other puff pastry and the like bakery products.

The flour used is any wheat flour of baking grade used to make doughs and batters; the particular flour used for a given dough or batter being that known to be most suitable. For example, the hard spring and hard winter wheat flours are most suitable for making bread doughs, while the soft red and soft white wheat flours are used for cake, pastry, cookie and the like doughs and batters.

The hydration prevention agent is any edible material which prevents starch from hydrating or gelatinizing unduly in the presence of heat. Examples are salt; sugars such as sucrose, glucose, fructose and the like; skim milk solids; shortening materials such as hydrogenated vegetable oils, animal fats, oleomargarine and the like; and mixtures of the above. Of these, salt is preferred. The amount of hydration prevention agent added to the flour is that which will give a viscosity of the flour suspension in water not greater than one-half the viscosity of the same flour suspension in water without any hydration prevention agent added, the viscosities of the flour suspensions being measured at the effective pasteurization temperature, e.g., 140° F. With sodium chloride, for example, from 10 to 25 parts of sodium chloride to 1000 parts by weight of flour in an aqueous suspension of 35–45% total solids will give the desired hydration prevention effect when the flour suspension is heated to inactivate the enzymes and bacteria. The higher limit of sodium chloride is governed more by its adverse effect on flavor, but to a degree by an impairment in volume of the baked product at higher levels. Thus, the requisite proportion of hydration prevention agent required for each flour suspension can be readily determined by simple viscosity measurements.

As to the remaining ingredients of the dough or batter, water, shortening, seasoning agents, flavoring compounds, leavening agents, and other usual ingredients employed in making doughs and batters and the proportions thereof are those conventionally used in making such bakery products as set forth above that are to be stored and subsequently baked. Typical formulations are set forth in the examples herein, Erekson et al., Pat. No. 2,942,988 and the Matz text entitled "Bakery Technology and Engineering" (1960), published by the AVI Publishing Company, Inc. There is no criticality in the formulation of the ingredients of the final products, save for the hydration prevention agent, and amount thereof, added to the flour prior to the pasteurization treatment.

It will be understood that the amount of hydration prevention material used is taken into account in calculating the formulation of the dough or batter made using the treated flour.

The processing conditions used are important in order to obtain the results desired. There is an interrelationship between the temperature to which the flour is heated, the time for which it is heated, and the solids range of the aqueous flour suspension. These conditions must be closely interrelated in order to obtain optimum results. It has been found that in order to inactivate the flour enzymes which are believed to be the cause of degradation of the flour, you must have a temperature above about 135° F. Such temperature is also necessary to pasteurize the flour, i.e., destroy substantially all the bacteria therein. Temperatures lower than 135° F. may be used, but the time to which the flour must be exposed to this heat to effect pasteurization and enzyme inactivation becomes inordinately long, and hence commercially undesirable. However, the temperature must not exceed about 150° F. since higher temperatures seriously damage the functional properties of the dough, previously noted. Also, the viscosity of the aqueous flour suspension becomes too high to operate at a practical solids level at temperatures above about 150° F.

The time for which the flour suspension containing a hydration prevention agent is held at a given temperature within the range noted depends upon the particular temperature used. The lower the temperature, the longer the treatment time, and as the temperature used rises to the upper limit the shorter the heating time. At 140° F. the time is 60 minutes with 30 minutes being sufficient at 145° F. Under these conditions at least about 70% of the lipase in the flour is inactivated and the flour is pasteurized.

With respect to solids, it is, of course, desirable to treat as much flour as possible because of economic restrictions. With a lower solids content, the cost of drying becomes excessive. On the other hand, at a high solids content and at temperatures necessary to inactivate the enzymes and destroy bacteria, the viscosity of the flour suspension becomes too high to operate effectively. It has been found that the solids range should be from 30% to 45% for optimum results when using temperatures of about 135° to 145° F.

In conjunction with solids, the most desired viscosity level of the flour suspension is about 10,000 c.p.s. to 25,000 c.p.s. This enables the suspension to be pumped for the most convenient handling. It will be recognized that in the treatment of the aqueous suspension of flour and the hydration prevention agent, there is a direct relationship between the solids content and the viscosity; with flour, the higher the solids content the higher the viscosity. The critical interrelationship is that of the temperature and time in conjunction with solids, and in the case of solids content there is the further direct relationship with the viscosity. After treatment the slurry is spray dried, preferably to a moisture content below about 10%. The resultant flour composition can then be used to prepare any dough or batter in which extended storage life is desired. The flour slurry can also be used as is by adding to it the other ingredients, such as shortening, eggs, etc. necessary to make the dough or batter.

The invention will be further illustrated by reference to the following examples of the practice of it, which are given for purposes of illustration. In these examples, the proportions are expressed as parts by weight, unless otherwise stated.

EXAMPLE 1

26 pounds of water were added to a Groen jacketed kettle outfitted with a Lightnin mixer. Water at a temperature of 145°–150° F. was circulated through the jacket of the Groen kettle. After the water in the kettle had warmed to about 130° F., 14 ounces of Tastex margarine were added to the kettle and thoroughly dispersed with mixer. Next 3.6 ounces of salt, 14 ounces of cane sugar, and 14 ounces of non-fat milk solids were added with mixing. Finally, 14 pounds of Occident flour were added gradually with continuous mixing to form a uniform dispersion. With continuous stirring, the slurry was heated to 140° F. and held at 140° F. for one hour. It was observed that even though 140° F. was above the temperature of 127° F. at which wheat starch ordinarily begins to gelatinize the slurry did not thicken unduly as might be expected, but remained fairly thin throughout the entire heating schedule.

The moisture content (Brabender) of the slurry at the end of one hour at 140° F. was 61.6%. This hot slurry was spray-dried according to the following conditions: box temperature, 210° F.; inlet temperature, 340° F.; nozzle orifice, 60–220; nozzle pressure, 1200 p.s.i.g. The spray-dried powder had a moisture content (Brabender) of 9.55%. Lipolytic enzyme activity of the flour in the spray-dried product was only 20% of that in the untreated flour. Therefore, 80% destruction of the lipase activity was achieved. Proteolytic enzyme inactivation in this particular experiment was 77%.

117 grams of this spray dried product at 9.55% moisture content was compounded with 20 grams of sodium bicarbonate, 17.75 grams of sodium acid pyrophosphate, 6.30 grams of fumaric acid, and 618 grams of water in a C–100 Hobart mixer to make a dough. The dough quality was judged to be normal, reacting just about the same as a dough containing untreated ingredients. A total of 300 grams of typical puff dough shortening was then laminated into the dough in the usual manner to make a chemical leavened puff pastry dough. Pieces were then stamped out of the dough sheet and packed into a canister typically used for refrigerated storage of doughs. The doughs "proofed" in the cans at room temperature just like untreated doughs, and were set aside at 40° and 50° F. for storage evaluation. Baking evaluations on the treated dough showed that this dough had a baking quality comparable to that of the untreated dough, measured by both organoleptic and objective quantitative tests. Shelf life of the treated doughs, as measured by periodic bake-off evaluation, can stability tests, bacterial growth curves, gas chromatographic tests, and other objective quantitative tests, was found to be about three times as long as that of the untreated doughs.

EXAMPLE 2

130 pounds of water were added to a 30 gallon pasteurizing vat connected in series with a hopper, recirculating pump and a triple-tube heat exchanger. With the water circulating a blend composed of 35 pounds of flour (Orbit), 35 pounds of flour (American Beauty), 14 pounds of cane sugar, 1.4 pounds of dextrose, 1.26 pounds of salt, 4.2 pounds of skim milk solids, and 0.7 pound of dried egg yolk was added to the system through the hopper for dry ingredients. Admixture of the dry ingredients with the circulating water resulted in a smooth slurry. The water in the tubes of the triple-tube heat exchanger was heated to 140°–145° F., and at the same time the water jacket of the pasteurizing vat was brought to 140° F. When the constantly circulating slurry reached 100° F., 1.4 pounds of emulsifier (Myvatex 7–40) and 4.2 pounds of shortening were added to the pasteurizing vat. These gradually melted and blended into the slurry. The slurry was further heated to 140°–142° F. and recirculated at this temperature for one hour. The hot slurry was then spray-dried according to the following conditions: box temperature, 220° F.; inlet temperature, 310° F.; nozzle orifice, 62–416; nozzle pressure, 1400 p.s.i. The spray-dried powder had a moisture content (Brabender) of 7.15%. There was 68% lipase destruction in the flour.

1388 grams of this spray-dried product at 7.15% moisture was compounded with 22 grams of sodium bicarbonate, 28 grams of sodium acid pyrophosphate, 2.5 grams of fumaric acid and 625 grams of water in a C-100 Hobart mixer to make a dough. The dough quality was judged to be normal, reacting just about the same as a dough containing untreated ingredients. A total of 195 grams of a typical puff dough shortening and 64 grams of butter were laminated into a dough by a series of successive folding and sheeting operations. Thin trianglar pieces of dough were then cut, rolled and packed into a canister typically used for refrigerated storage of doughs. The doughs expanded and "proofed" in the cans at room temperature just like untreated doughs, and were set aside at 40° and 50° F. for storage evaluation. Baking evaluations on the treated dough showed that this dough had a baking quality comparable to that of the untreated dough, measured by both organoleptic and objective quantitative tests. The outstanding advantage of the treated product was shelf life stability, more particularly, can stability. No exudation nor can ruptures were noted in cans with treated doughs even through 20 weeks at 50° F. Similar cans with untreated doughs showed severe exudation in most cases, with signs of can failure, even to the point of exploding in some cases.

EXAMPLE 3

133 pounds of water were added to a 30 gallon pasteurizing vat connected in series with a hopper, recirculating pump and a triple-tube heat exchanger. With the water circulating a blend composed of 70 pounds of flour, 2 pounds and 10 ounches of dextrose, 1 pound and 12 ounces of salt and 2 pounds and 13 ounces of skim milk solids was added to the system through the hopper for dry ingredients. Admixture of the dry ingredients with the circulating water resulted in a smooth slurry. The water in the tubes of the triple-tube heat exchanger was heated to 140°–145° F., and at the same time the water jacket of the pasteurizing vat was brought to 140° F. When the slurry being recirculated reached a temperature of 100° F., 8 pounds and 12 ounces of shortening were added to the pasteurizing vat. The shortening gradually melted and blended into the slurry. The slurry was further heated to 140°–142° F. and recirculated at this temperature for one hour. The hot slurry was then spray-dried according to the following conditions: box temperature, 200° F.; inlet temperature, 300° F.; nozzle orifice, 64–416; nozzle pressure, 1500 p.s.i.g. The spray-dried powder had a moisture content (Brabender) of 3.40%. Determination of lipase activity in the treated and untreated flour showed that 89.0% of the lipase had been destroyed by the process of pasteurization.

8998 grams of pasteurized and spray-dried ingredients at 3.40% moisture was compounded with 160 grams of sodium bicarbonate, 144 grams of sodium acid pyrophosphate, 28 grams of fumaric acid and 5692 grams of water in a Day horizontal mixer (75 lb. capacity). The dough was dumped from the mixer and divided into 4 equal pieces for further processing. Each piece in succession was sheeted out on a dough sheeter to about one-half inch and lapped. This sheeting and lapping was repeated twice. Finally, each piece of dough was sheeted out to about three-eighths inch in thickness. Pieces were then stamped out of each dough sheet and packed into canisters typically used for refrigerated storage of doughs. The dough responded in every way like a regular, untreated dough. The "proofed" cans of dough were set aside at 40° and 50° F. for storage evaluation. Baking evaluations on the treated dough showed that this dough had a baking quality comparable to the untreated dough, as measured principally by organoleptic evaluations. Shelf life of the treated doughs was found to be about three times as long as the untreated doughs, determined mainly by organoleptic tests on the baked doughs and can stability tests.

It will be understood that it is intended to cover all changes and modifications of the examples of the invention herein chosen for the purpose of illustration which do not constitute departures from the spirit and scope of the invention.

What is claimed is:

1. The method of inhibiting degradative enzymes present in flour and pasteurizing the flour, comprising the steps of forming an aqueous flour suspension having a 55% to 70% moisture content by weight in the suspension and adding thereto a hydration prevention agent selected from the group consisting of salt, sugars, shortening materials, skim milk solids, and mixtures thereof, heating the suspension to a temperature to about 135° to 150° F. for time sufficient to substantially inactivate the degradative flour enzymes and pasteurize the flour said hydration prevention agent being present in an amount sufficient to result in a suspension viscosity measured in centipoises which is not greater than one-half the viscosity of the same flour suspension in water measured without any added hydration prevention agent, the comparative viscosities of each of the suspensions being measured at the effective pasteurization temperature.

2. The method of claim 1, wherein the hydration prevention agent is salt.

3. The method of claim 1, wherein the hydration prevention agent is added in amount to adjust the viscosity of the flour suspension to from about 10,000 cps. to about 25,000 cps.

4. The method of claim 3, wherein the hydration prevention agent is salt.

5. The method of claim 4, wherein the flour suspension is heated at a temperature and for a time ranging from about 140° F. for 60 minutes to about 145° F. for 30 minutes and spray dried.

References Cited

UNITED STATES PATENTS 3,159,493  12/1964  Japikse et al. _____ 99—232X
3,159,495  12/1964  Japikse _____ 99—232

OTHER REFERENCES

Huber: "The Effect of Salt on the Utilization Characteristics of Wheat and Rye Flour," The Bakers Digest, February 1965, p. 87.

RAYMOND N. JONES, Primary Examiner

J. R. HOFFMAN, Assistant Examiner

U.S. Cl. X.R.

99—93, 94